(12) United States Patent
Orman et al.

(10) Patent No.: US 7,076,555 B1
(45) Date of Patent: Jul. 11, 2006

(54) SYSTEM AND METHOD FOR TRANSPARENT TAKEOVER OF TCP CONNECTIONS BETWEEN SERVERS

(75) Inventors: Hilarie Orman, Woodland Hills, UT (US); Howard Rollin Davis, Salem, UT (US); Jamshid Mahdavi, San Jose, CA (US)

(73) Assignee: Novell, Inc., Provo, UT (US)

( * ) Notice: Subject to any disclaimer, the term of this patent is extended or adjusted under 35 U.S.C. 154(b) by 700 days.

(21) Appl. No.: 10/055,865

(22) Filed: Jan. 23, 2002

(51) Int. Cl.
    G06F 15/16      (2006.01)
    G06F 15/173     (2006.01)
    G06F 11/00      (2006.01)

(52) U.S. Cl. ............... 709/227; 709/231; 709/223; 714/4; 370/216

(58) Field of Classification Search .............. 714/4; 370/217; 364/187; 713/201; 709/227, 231
    See application file for complete search history.

(56) References Cited

U.S. PATENT DOCUMENTS

| | | | |
|---|---|---|---|
| 5,642,511 A | 6/1997 | Chow et al. | |
| 5,784,566 A | 7/1998 | Viavant et al. | |
| 5,828,569 A * | 10/1998 | Fisher .................. | 700/82 |
| 5,924,116 A | 7/1999 | Aggarwal et al. | |
| 5,961,593 A | 10/1999 | Gabber et al. | |
| 5,964,891 A | 10/1999 | Caswell et al. | |
| 5,999,734 A | 12/1999 | Willis et al. | |
| 6,014,667 A | 1/2000 | Jenkins et al. | |
| 6,018,619 A | 1/2000 | Allard et al. | |
| 6,112,228 A | 8/2000 | Earl et al. | |
| 6,151,688 A | 11/2000 | Wipfel et al. | |
| 6,185,598 B1 | 2/2001 | Farber et al. | |
| 6,185,625 B1 | 2/2001 | Tso et al. | |
| 6,229,809 B1 | 5/2001 | Murphy et al. | |
| 6,330,605 B1 | 12/2001 | Christensen et al. | |
| 6,826,613 B1 * | 11/2004 | Wang et al. ................. | 709/227 |
| 6,910,078 B1 * | 6/2005 | Raman et al. .............. | 709/231 |
| 2002/0112189 A1 * | 8/2002 | Syvanne et al. ........... | 713/201 |
| 2003/0014684 A1 * | 1/2003 | Kashyap ...................... | 714/4 |
| 2003/0039209 A1 * | 2/2003 | Webber ..................... | 370/217 |

OTHER PUBLICATIONS

United States Pending Patent Application for a Proxy Cache Cluster, U.S. Appl. No.: 09/195,982, filed: Nov. 19, 1998, by Christensen et al.

(Continued)

*Primary Examiner*—John Follansbee
*Assistant Examiner*—Philip C. Lee
(74) *Attorney, Agent, or Firm*—Schwegman, Lundberg, Woessner & Kluth, P.A.

(57) ABSTRACT

A system and a method for transparent takeover (or failover) of a remote client TCP connection from a first server in a cluster of interconnected servers to a second server provides the storing of shared state information relative to the connection on each involved server and using of the shared state information to reestablish the connection on the second server. A message using a sequence number to refer to a previously transmitted data element (such as a byte) is sent by the second server and a received client acknowledgement (ACK) of that sequence number, or a higher one, is used to synchronize the server's data packet transmission sequence number with the ACK-transmitted sequence number. If synchronization is successful, then the connection is restarted on the second server from the point of termination/failure on the first server.

2 Claims, 6 Drawing Sheets

OTHER PUBLICATIONS

United States Pending Patent Application for a System and Method for Partitioning Address Space in a Proxy Cache Server Cluster, U.S. Appl. No.: 09/877,918, filed: Jun. 7, 2001, by R.D. Major et al.

* cited by examiner

SYSTEM AND METHOD FOR TRANSPARENT TAKEOVER OF TCP CONNECTIONS BETWEEN SERVERS

BACKGROUND OF THE INVENTION

1. Field of the Invention

This invention relates to networked file servers and caching proxy servers and more particularly to systems and methods for implementing a takeover of a reliable network connection by a backup host machine, particularly file servers, caching proxy servers, database servers, streaming media servers, or database proxies.

2. Background Information

It is increasingly common for users having standalone computers, or computers interconnected by an institutional intranet or local area network, to gain access to various remote sites (such as those on the "World Wide Web") via the well-known Internet communications network. Using resident web browser applications executing on the computers, these clients may navigate among services ("pages") stored on various servers of a service provider ("web site") and may further request these services as desired. In a basic network communication arrangement, clients are free to access any remote web site for which uniform resource locators (URLs) are available.

It is also increasingly common in network applications to provide the web site servers with associated proxy cache servers that link ("front-end") the servers with the Internet. A proxy cache server ("proxy") may be used to accelerate client access to the Internet ("forward proxy"), to accelerate Internet access to a web server ("reverse proxy"), or to accelerate Internet access transparently to either client access or web server access ("transparent proxy"). As for the latter reverse proxy environment, the proxy may access frequently requested services from the web servers and store ("host") them locally to effectively speed-up access to future requests for the services. For instance, a proxy may host frequently requested web pages of a web site. In response to a request from a browser executing on a client, the proxy attempts to fulfill that request from its local storage. If it cannot, the proxy forwards the request to a web site server that can satisfy the request. The web server then responds by transferring a stream of information to the proxy, which stores and forwards the information over the Internet onto the client. The illustrative embodiment of the invention described herein is applicable to a proxy environment.

As Internet traffic to the web site increases, the network infrastructure of the service provider may become strained attempting to keep up with the increased traffic. In order to satisfy such demand, the service provider may provide additional web servers and/or associated proxies. The additional machines will have unique network addresses.

These network addresses are typically Transmission Control Protocol/Internet Protocol (TCP/IP) addresses that are represented by filenames or URLs including wordtext (domain) names and that are published in a directory service, such as the well-known Domain Name System (DNS). Computers referred to as name servers implement DNS by mapping between the domain names and TCP/IP address(es).

In the case of a "reverse proxy," the proxies "front-end" the web servers (and may, in fact, be resident on the web servers) and the network addresses of the proxies (rather than the actual web site) are generally mapped to the domain name of the service provider.

Applications running on a proxy generally use an application program interface (API) based on sockets for their access top transport protocols, such as TCP and UDP. A socket is essentially an interface between an application layer and transport layer of a protocol stack that enables the transport layer to identify which application it must communicate with in the application layer. For example, a socket interfaces to a TCP/IP protocol stack via a set of APIs consisting of a plurality of entry points into that stack.

Applications that require TCP/IP connectivity typically utilize the socket API to interface into the TCP/IP stack. For a connection-oriented protocol such as TCP, the socket may be considered a session. However, for a connectionless protocol such as IP datagram using the User Datagram Protocol (UDP), the socket is an entity/handle that the networking software (protocol stack) uses to uniquely identify an application layer end point, typically through the use of port numbers. The software entity within the server that manages the communication exchanges is a TCP/IP process, which is schematically illustrated as layers of a typical Internet communications protocol stack. Protocol stacks and the TCP/IP reference model are well-known and are, for example, described in *Computer Networks* by Andrew S. Tanenbaun, printed by Prentice Hall PTR, Upper Saddle River, N.J., 1996.

Where web and other network-based data content is provided in large volume from a particular source, and/or to a particular group of users, the use of a multiple-server proxy caching array is highly desirable. In other words, a plurality of interconnected servers all residing on a local network are used to cache and vend content to clients based upon the clients' requests. One known implementation of a "cluster" of proxy cache servers (e.g. a proxy cache cluster or PCC) is the Excelerator™ appliance and associated software available from Volera, Inc. of San Jose, Calif. As part of such a cluster, a gateway router and Layer 4 (L4) switch may be employed. The L4 switch (or similarly operable component), in particular performs "load balancing." By load-balancing it is meant that the switch assigns requests to various caches based upon a mechanism that attempts to balance the usage of the caches so that no single cache is over-utilized while taking into account any connection context associated with the client requesting the content dataflow.

When a server in a cluster fails, the TCP-based (more-formally termed "TCP/IP") connections it has established will generally terminate unless a "hot backup" server is available. Such a server is a machine running in tandem with the failed server, and carrying the same connections. Clearly, this is a significant drain on server resources that may only be practical for critical data connections. Where a hot-backup arrangement is not employed, an alternative backup mechanism involves the resumption of the lost TCP-based connection(s) on a different server, or the same server, once restarted/rebooted. This approach, while less demanding on resources, is more time-consuming due to the delays in restarting and reestablishing the connection(s). Further, the hot backup server must be configured as a backup for a particular server-it cannot share the backup responsibilities with other servers in the cluster. In other words, it is dedicated to the server for which it is a backup.

It is desirable to provide a technique for address-partitioning a proxy cache cluster and associated proxy partition cache (PPC) that enables address partitioning at the proxy cache at the cache situs without an external load-balancing mechanism, thereby freeing the L4 switch from any additional address partitioning responsibilities. The PPC architecture should thereby relieve congestion, and overfilling of the caches with duplicate copies of large files. The PPC architecture is just one example of an application of the present invention. The present invention is also applicable to other architectures that utilize L4 switches and other load-balancing and/or failover switching devices.

It is further desirable to provide a system and method for providing "transparent failover" for TCP-based connections that are served by a group of cooperating servers, such as a proxy cache cluster. That is, the connections should be maintained in a manner that does not significantly delay or inconvenience the client with whom the TCP-based connection is established. This system and method should not cause an undesirable increase in server resource usage.

SUMMARY OF THE INVENTION

The present invention overcomes the disadvantages of the prior art by providing a system and a method for transparent takeover (or failover) of a remote client TCP connection from a first server in a cluster of interconnected servers to a second server by storing shared state information relative to the connection on each involved server and using the shared state information to reestablish the connection on the second server. With this mechanism, a networked application using TCP connections can resume on a second computer without any TCP connection resets or restarts (i.e., starting a new connection using SYN (connection initiation) packets).

According to an illustrative embodiment, an ACK (acknowledgement) of a previously transmitted data byte, denoted by its sequence number, is transmitted by the second server. Subsequently, a received client acknowledgement (ACK) with a sequence number equal to or greater than the sequence number used by the second server is used to synchronize the server's data packet transmission sequence number with the ACK-transmitted sequence number. If synchronization is successful, then the connection is restarted on the second server from the point of termination/failure on the first server. In particular, the successful synchronization causes an application program interface (API) to callback "ready" to each protocol layer above the TCP transport layer in the second server's networking stack. This ready callback allows the recreated local connection structure in each layer to be used to send and receive data over the connection.

A connection checkpoint API call is used by each server application at a periodic interval to update the shared state information on an ongoing basis. The checkpoint can include application specific information, including URL, number of bytes transferred, etc. and automatically includes TCP/IP information from the transmission control block (TCB) and network layer. A checkpoint can be used to decide whether a connection has failed, and if it can be restarted (e.g. if it is not performed within a sufficient time). The checkpoint can be used to bundle connection information that is related, such as File Transfer Protocol (FTP) control and data connections.

In an illustrative embodiment, a connection checkpoint is performed with the API so as to communicate with each of a plurality of protocols in the first server and so as to cause each of the plurality of protocols to append relevant state information to a data block passed to each of the plurality of protocols with respect to the connection, and to thereby provide the relevant state information to the shared state information. The API can relate the compared/synchronized sequence numbers, in conjunction with the ready signal, to a byte sequence number in an object referenced in the shared state information. The relating of sequence numbers by the API can further include resuming the sending of the data associated with an object (URL or file or other named object) over the restarted TCP connection.

According to one embodiment of this invention, the assignment of the backup (second) server is accomplished at the point of failure (or overburdening) of the first server.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
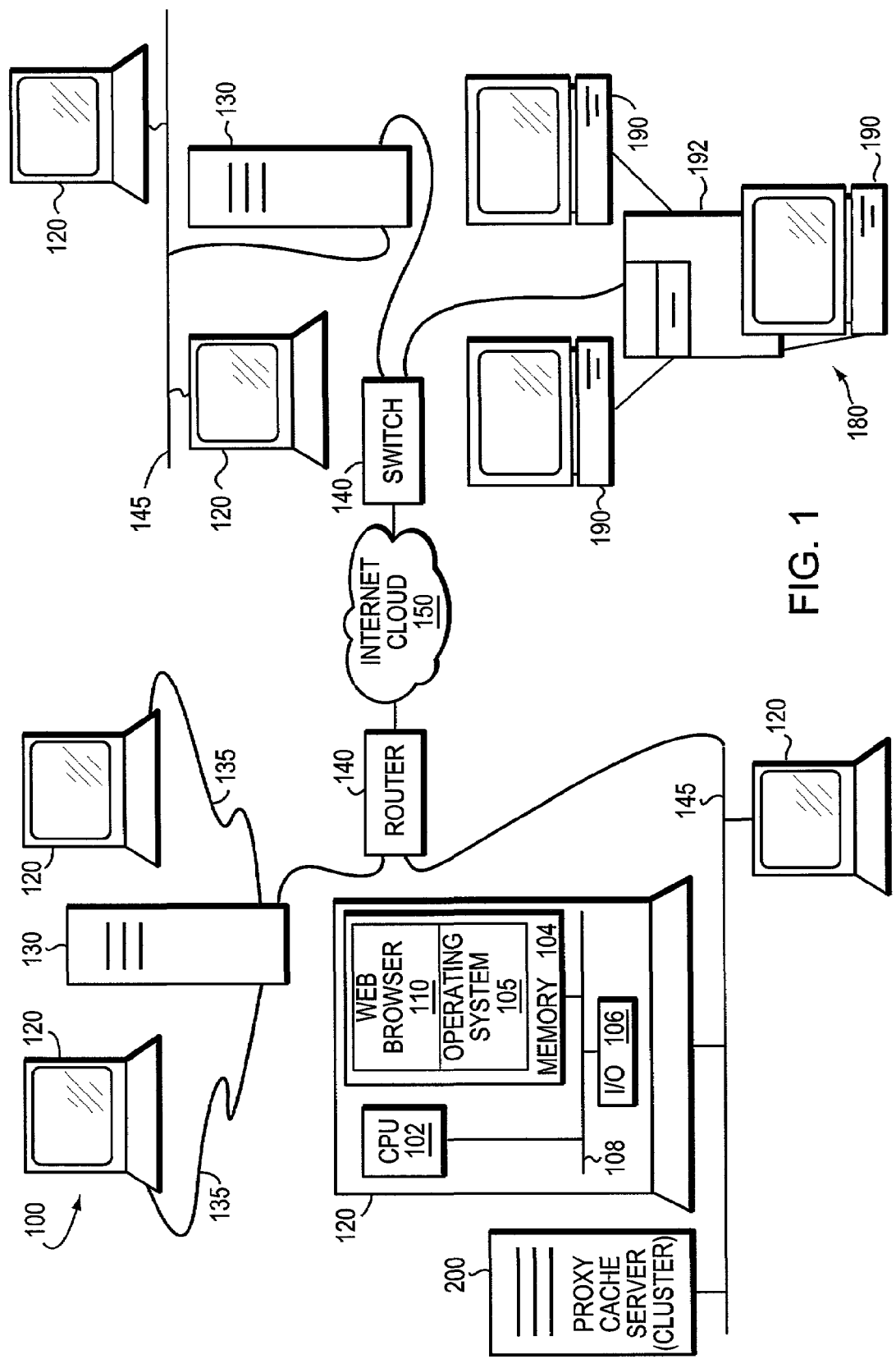
FIG. 1 is a block diagram of a computer inter-network including a collection of network segments connected to a plurality of client and server computers, the latter of which may be organized as a service provider and/or a networked proxy cache server.

FIG. 1 is a schematic block diagram of a computer inter-network 100 comprising a collection of network segments connected to a plurality of generalized computers 120 and servers 130, 190, 192 and 200, as well as a router 140 and switch unit 142. Each computer generally comprises a central processing unit (CPU) 102, a memory 104, and an input/output (I/O) unit 106 interconnected by a system bus 108. The memory 104 may comprise storage locations, typically composed of random access memory (RAM) devices that are addressable by the CPU 102 and I/O unit 106. An operating system 105, portions of which are typically resident in memory and executed by CPU, functionally organizes the computer by, inter alia, invoking network operations in support of application programs executing on the CPU. An example of such an application program is a web browser 110, such as the Netscape® browser available from Netscape Communications Corporation.

The above-described generalized/general purpose computers could be packaged as any of several useful devices, such as a desktop computer, a personal digital assistant (PDA with wireless network connection), a set-top box (accessory to a television), or a cell-phone with an embedded computer.

The network segments may comprise local area networks (LANs) 145 or intranets, point-to-point links 135 and the well-known Internet 150. Collectively, the segments are interconnected by intermediate stations, such as a network switch 142 or a router 140, and configured to form an inter-network of computers that communicate by exchanging data packets according to a predefined set of protocols, such as the Transmission Control Protocol/Internet Protocol (TCP/IP). It should be noted that other techniques/protocols, such as Internet Packet Exchange (IPX) protocol, the Real-Time Protocol (RTP) and/or the Hypertext Transfer Protocol (HTTP), the Networked File System (NFS), and others might be advantageously used.

In the illustrative embodiment, the inter-network 100 is organized in accordance with a client/server architecture wherein computers 120 are personal computers or workstations configured as clients for interaction with users, and the computers 130, 190 and 192 are configured as servers that perform services as directed by the clients. For example, the servers 190 may be configured as a group to operate as a service provider (e.g., the "web site" 180), and as such, can be coordinated by a load-balancing server 192. As described further herein, the servers 130 may be configured as domain name system (DNS) servers and/or Internet provider access servers. In general, the DNS servers provide the clients 120, origin servers, and proxies with the network (e.g., IP) address(es) of requested services in response to queries about the domain names for those services. The routers 140 direct packets towards the location of the servers and clients whose addresses are in the internetwork packets. The Internet providers, on the other hand, provide Internet access to the clients via, e.g., dial-up telephone lines or cable links.

Figure 2:
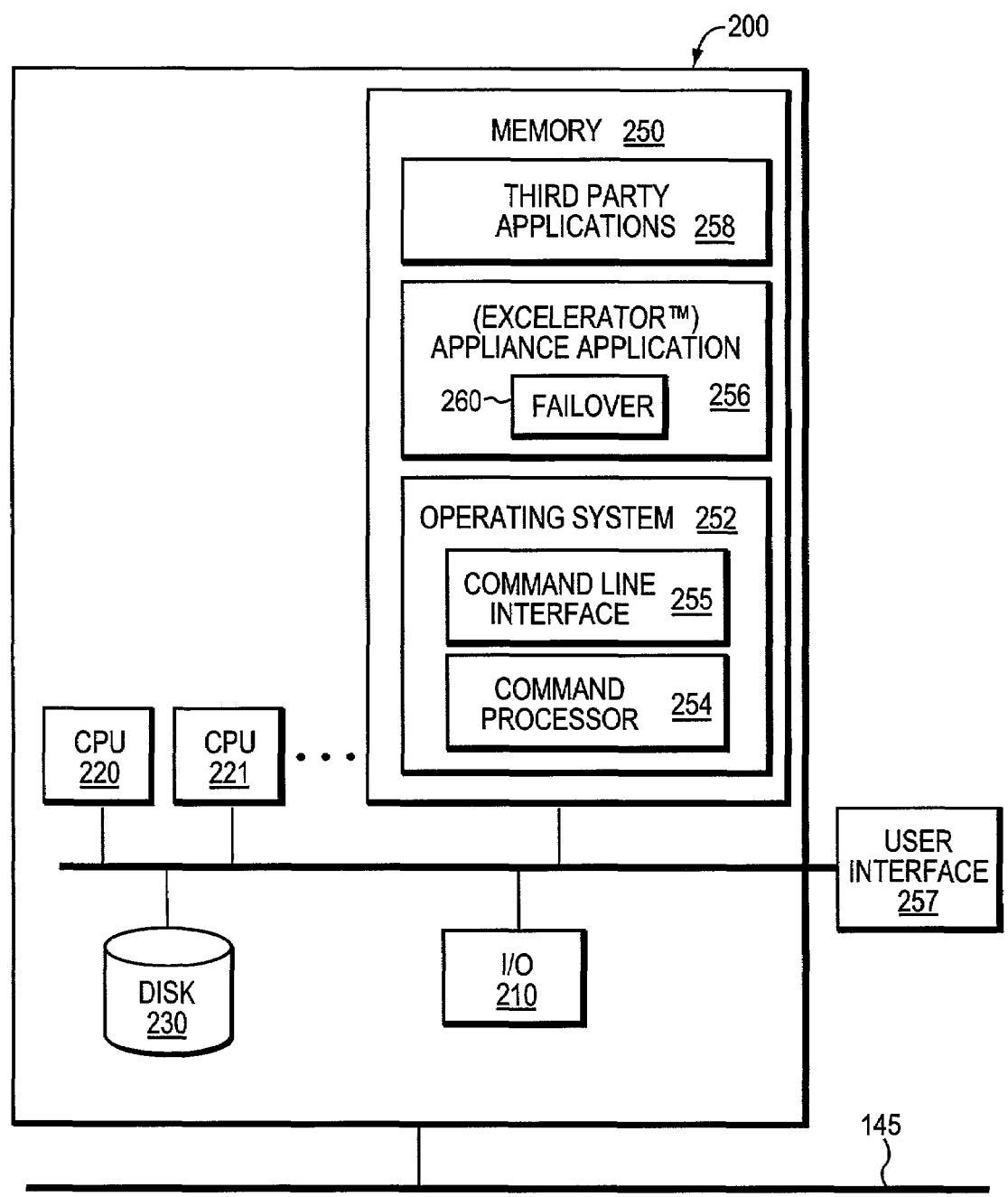
FIG. 2 is a block diagram of a proxy cache server connected to a network, showing both hardware and software components.

The client 120 may utilize the web browser 110 to gain access to the web site 180 and to navigate, view or retrieve services stored on the servers 190 (hereinafter "web servers"). In order to effectively speed-up access to the service provider and reduce the retrieval time for stored services, information retrieved from web servers may be cached at one or more proxy cache servers 200 (e.g. a multi-server cluster). Such proxy cache servers may alternatively be associated solely with one or more web servers as illustrated in FIG. 2. While the proxy cache and web server functions can be combined in a single server, it is more common to divide the web server and proxy caching component and interconnect them via the local area network (LAN), or other dedicated connections therebetween. One web server can be associated with a plurality of proxy cache servers. Alternatively, a single proxy cache can be a reverse proxy for many web servers.

FIG. 2 is a block diagram of a proxy cache server 200 or appliance connected to a network 145, showing both hardware and software components. A proxy cache server generally comprises one or more CPUs 220, 221, a memory 250, a hard disk 230, and an input/output unit 210 (for example, a network interface card (NIC)). The CPUs may be advantageously arranged in a multiprocessing (MP) or symmetric multiprocessing (SMP) configuration where two or more processors are connected via a bus 240, each processor having equal access to I/O 210 and storage devices 230, 250. The memory 250 may comprise RAM, which is addressable by the CPUs 220, 221 and by the I/O unit 210. An operating system 252, portions of which are typically stored on the disk 230 and other portions of which are typically resident in memory 250, functionally organizes the computer and supports application programs. The operating system further contains a command processor 254, which interprets and executes commands entered by a command line interface (CLI) 255, or via a graphical user interface (GUI) and its associated drivers 257. The command processor directs commands towards specific hardware components (for example, directing a command to a specific processor) and to limit the amount of system resources within various system components (for example limiting the amount of available memory or hard disk space used). Appliance application programs 256, such as the Excelerator™ available from Volera, Inc. of San Jose, Calif., and third party applications 258, are also stored in memory 250 and are invoked on the CPU's 220, 221 with support from the operating system 252. Current versions of the exemplary Excelerator™ appliance and software can be configured to handle more than 12,300 requests per second using up to, or exceeding, 300,000 simultaneous TCP connections.

Figure 3:
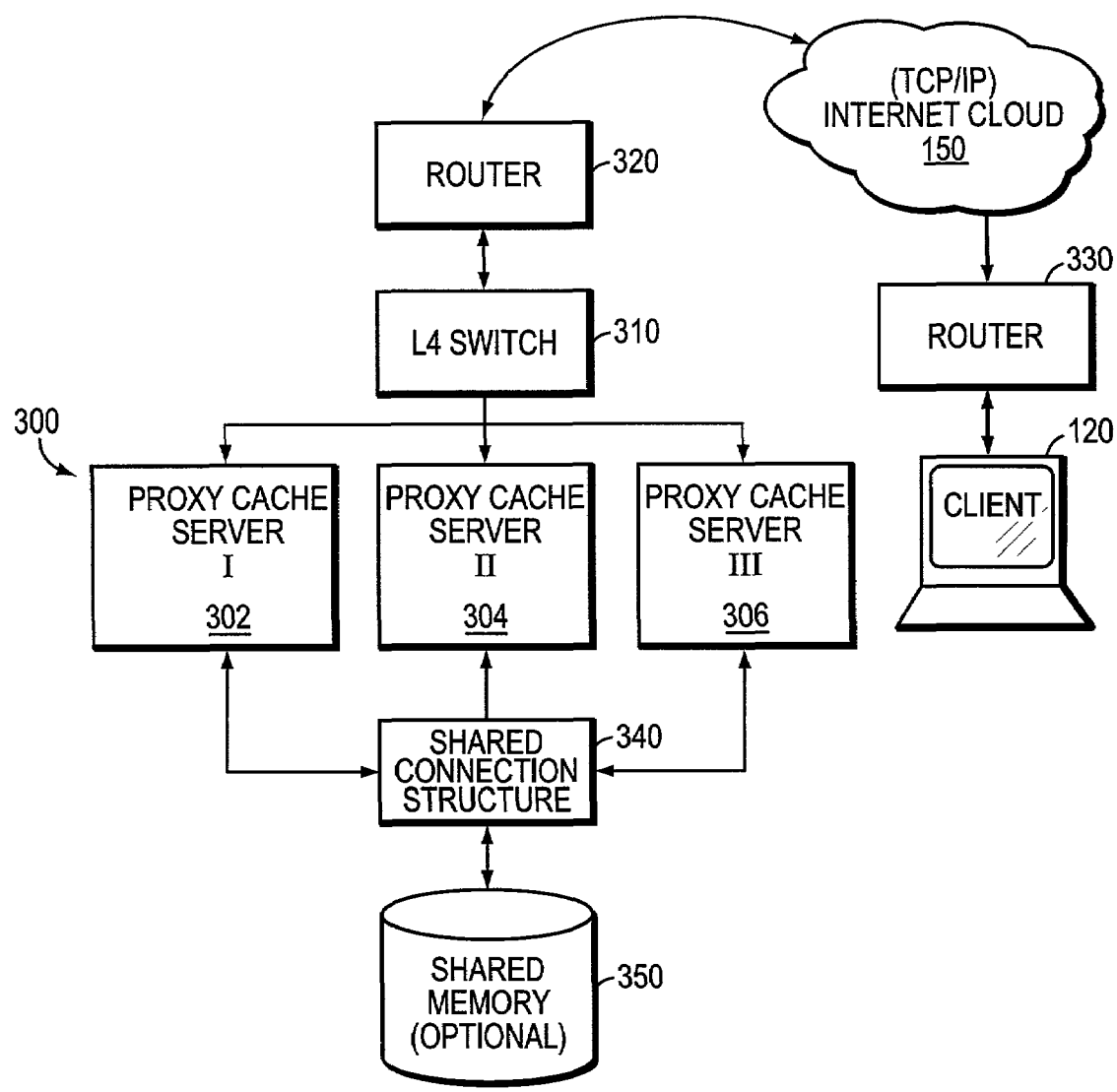
FIG. 3 is a block diagram of a plurality of proxy cache servers interconnected by a switching arrangement on a computer network for use advantageously with the teachings of this invention.

FIG. 3 is a more-generalized block diagram of a proxy cache server cluster 300 connected to a network. Such a cluster generally comprises two or more proxy cache servers (Servers I, II and III) 302, 304 and 306 respectively, interconnected with the Internet 150 or another packet-based communication network through an exemplary L4 switch 310 and router 320. The servers establish connections with an exemplary client 120 as shown, also served by a router 330, and possibly, a server/intranet (not shown) connected to the client. The servers 302, 304 and 306 intercommunicate to handle incoming cache requests using a variety of cooperative processing methods, and they are linked by a shared connection structure 340 that can be physically implemented over a local area network (LAN), upon which the servers reside, and whereby packet-based information is transferred between servers. The shared connection structure can also be implemented as a dedicated parallel or serial bus interconnection between servers (e.g. a peripheral component interconnect (PCI) bus). An optional shared memory 350 can be included, accessible by each of the servers over the bus or network. Appropriate storage adapters and controllers can be provided to control access to the memory 350. It is expressly contemplated that a dedicated bus or network-based shared connection structure (or both) can be used to carry out the principles of this invention.

Such a cluster configuration can be advantageously employed to provide load balancing of cache resources, whereby caches that receive a large number of data requests forward or otherwise assign these requests to a more-lightly loaded cache. Load balancing can be implemented via the L4 switch (or software-based connection manager such as the Web Caching Cooperation Protocol WCCP) 310 and/or using internal load-balancing functionality in the cluster. One exemplary arrangement for a proxy cache cluster, in keeping with the teachings of this invention is discussed in commonly owned U.S. patent application Ser. No. 09/195,982, entitled PROXY CACHE CLUSTER by Brent R. Christensen, et al., the teachings of which are expressly incorporated herein by reference. An example of load-balancing between servers in a cluster is described generally in commonly owned U.S. patent application Ser. No. 09/877,918, entitled SYSTEM AND METHOD FOR PARTITIONING ADDRESS SPACE IN A PROXY CACHE SERVER CLUSTER by Robert Drew Major, et al., the teachings of which are also expressly incorporated herein by reference.

Notably, this proxy cache cluster arrangement can provide failover support in the event of server failure, whereby functioning cache servers dynamically assume the roles of failed machines. The cache servers 302, 304 and 306 can implement a failover function using the shared connection structure 340. An appropriate failover application 260 (FIG. 2) is provided for this purpose in each server. That is, the servers can write to the shared connection structure state information that enables a second server to take over the connections and other functions of a failed first server. This shared state information is described further below.

Figure 4:
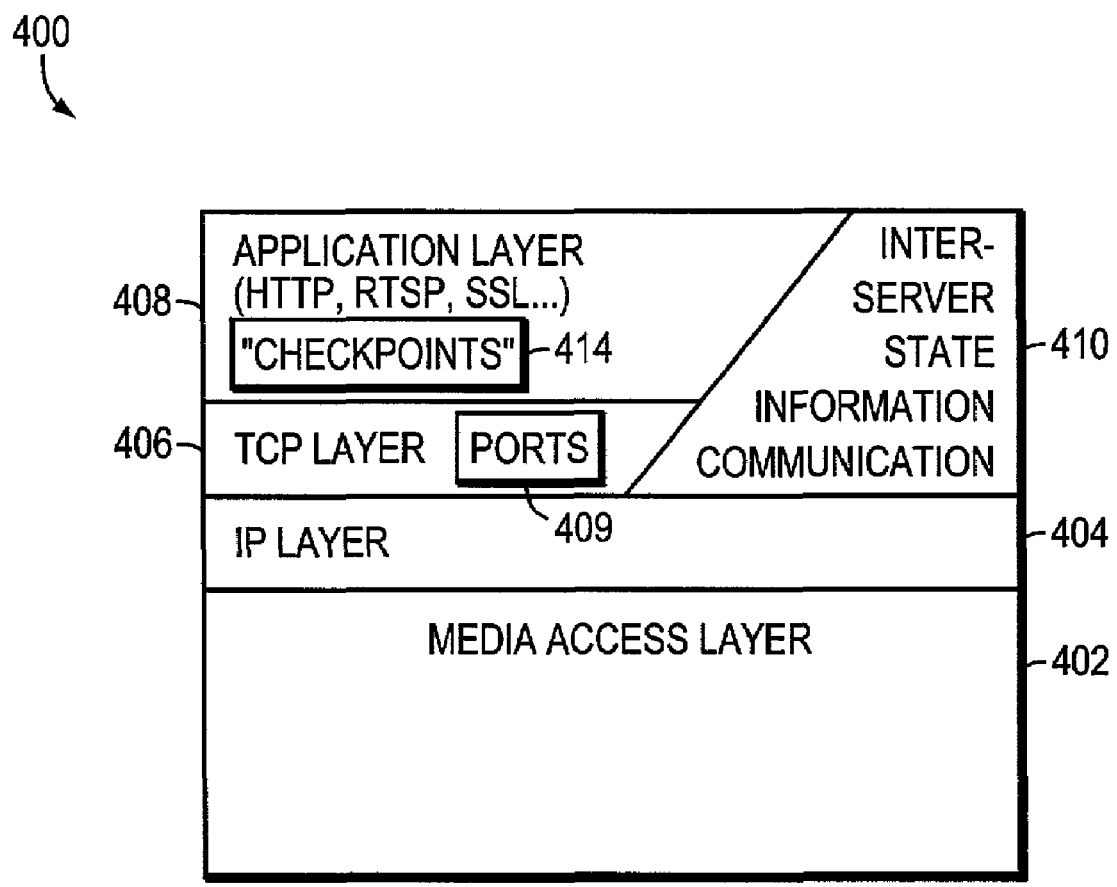
FIG. 4 is a block diagram of communication protocol layer stack illustrating an associated inter-server state information block in accordance with an illustrative embodiment of this invention.

FIG. 4 shows a modified communication protocol (networking) stack 400 associated with each of the servers 302, 304 and 306. The stack 400 represents a series of software layers, including a media access layer 402 of network drivers (e.g., an Ethernet driver). The stack 400 further includes network protocol layers, such as the IP layer 404 and its TCP layer 406. A UDP layer can also be provided (not shown). An application layer 408 resides at the top of the stack 400 representing various software applications such as HTTP, Real-Time Session Protocol (RTSP) and Secure Socket Link (SSL). The TCP layer has associated therewith various "ports" 409 supporting connections. In a common scheme of load-balancing, TCP port numbers are used to distribute connections more evenly between various servers in a cluster. Each server has assigned to it a unique IP address, based upon which, packets to and from a client are addressed.

Interfacing with the TCP and application layers 406, 408 of the networking stack 400 is a vehicle for communication of inter-server state information (e.g. the shared state information) 410. This "shared state" information is made accessible to each server in the cluster and is updated on a periodic basis using communication checkpoints 414 defined as application program interface (API) calls within applications. The shared state information may be shared by storing it in the shared memory 350, and/or by exchanging the information periodically over the shared connection structure (e.g. a LAN) for local storage in each local server disk. Where it is constantly exchanged, the exchange events can be performed at a set time interval (e.g. every 100 milliseconds), or when a certain number of bytes have been transferred to and from the client, or by other methods that assure that the information is current enough to allow the application to function normally when restarted Generally, shared state information is that required by a second server to seamlessly maintain a TCP connection with a remote client, if a first server fails suddenly. The shared information is also, generally, the information needed by the application for resuming its functional state in a useful manner.

Figure 5:
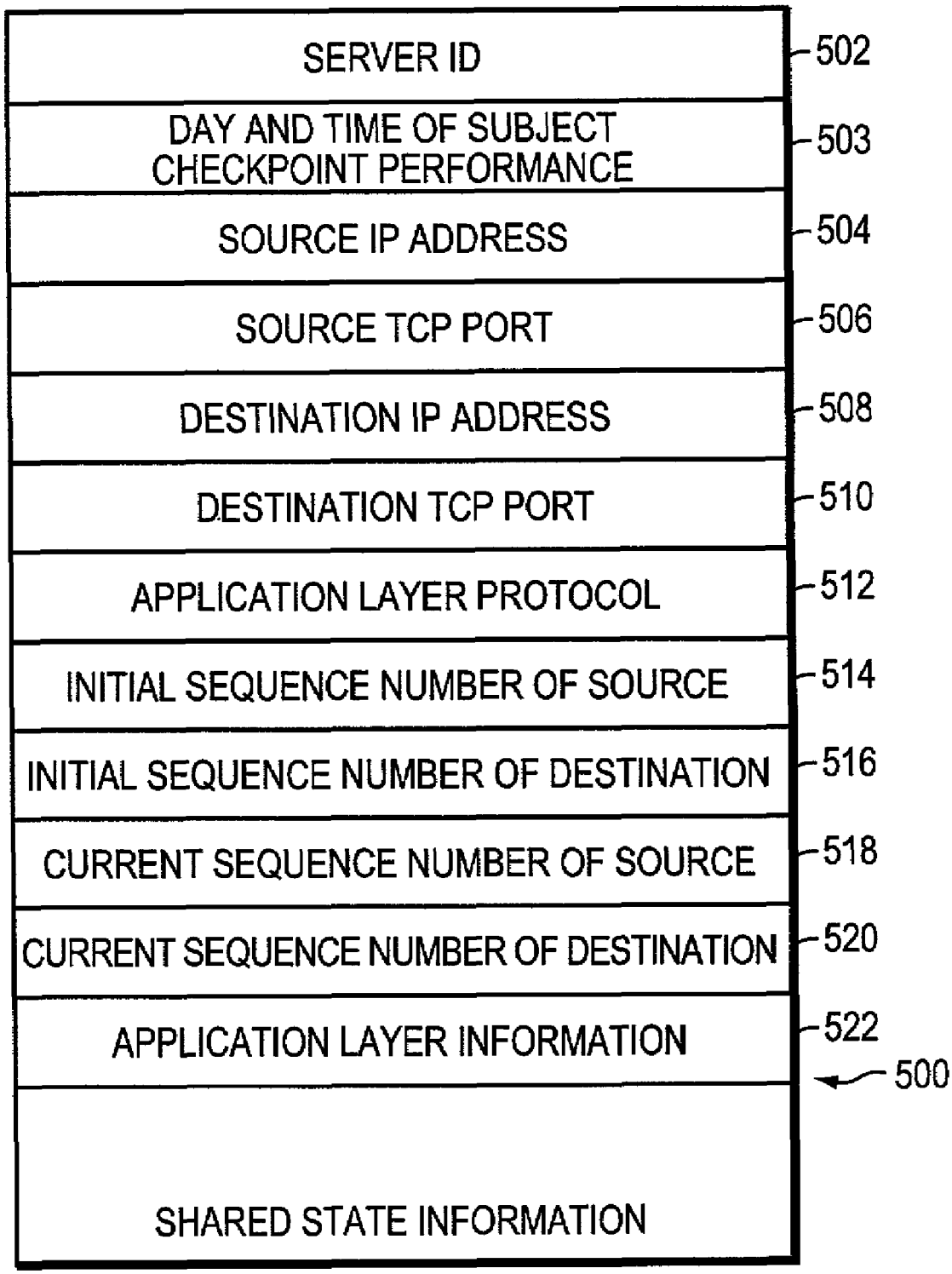
FIG. 5 is a block diagram showing exemplary shared state information for the each active TCP connection in the server cluster.

FIG. 5 shows a table 500 of exemplary shared state information for each TCP connection with a client on each server. This information includes: the current (e.g. first) proxy cache server's identifier 502; the day and time (to at least the nearest 100 milliseconds) at which the subject checkpoint was performed 503; the source IP address 504; the source TCP port 506; the destination IP address 508; the destination TCP port 510; the application layer protocol (e.g. HTTP, RTSP, SSL, etc.) 512; the initial packet sequence is number for the source transmission 514; the initial packet sequence number for the destination transmission 516; the current packet sequence number for the source transmission 518; the current packet sequence number for the destination transmission 520; and the application layer information 522. The exemplary application information for HTTP includes the starting TCP sequence number for the object, the protocol version, object name (URL), object validator(s) (e.g. Last Modified Date, any Etag values, etc.), the request range, the method (GET, POST, DELETE) and the connection type (persistent or non-persistent).

In order for an application such as HTTP or RTSP to obtain the starting TCP sequence number for an object, it must be able to coordinate its API call for "send" with TCP's assigned sequence number for the first byte of the sent data. The coordination is done through an extension to the API. One embodiment would accomplish this through a return code parameter for the "send" API call. The network stack would calculate the number of bytes of data queued in the stack but not yet sent on the TCP connection and add this to the current send sequence number for the TCP connection- this calculated value would be returned to the application as part of the "send" API call for inclusion in its checkpoint data. An alternate embodiment would add a new API call especially for calculating and returning the "next" sequence number for TCP queued data. If no data were queued, the calculated value would be equal to the current TCP send sequence number.

In general, the sharing of state information allows the servers to remain sufficiently up-to-date with the current information on each TCP connection without requiring absolute synchronization of a backup server with the current client-connected server. As noted above, the various applications use communication checkpoints (API calls) that can include specific application information, such as the Uniform Resource Locator (URL), number of bytes transferred, etc. The API call can also includes the connection's TCP/IP information automatically by using the TCP protocol's checkpoint API as described herein. Each protocol, including TCP and IP, should have a checkpoint API that causes it to append its state information to a data block passed to it with respect to the connection. In other words as each connection data block is passed along the stack, the respective stack protocol provides its particular state information for inclusion in the shared state information. If an API call has the capability of traversing the entire protocol stack, then SSL state information can also be included. Information collected in this manner is written to the shared information structure for the cluster. The sharing of the state information amongst servers involves constant update so that the information is not rendered too old to be used in a seamless failover. As such, checkpoints occur based upon a sliding scale. For example, the period for performing checkpoint API calls may depend upon the number of bytes transferred or an absolute time interval or both or other algorithms/ procedures that ensure freshness of the data with respect to the application needs. For connections having a fast-throughput (for example, millions of bytes per sec), the checkpoint may occur each time a relatively large byte count (for example, 100 thousand bytes) has been transferred, while a slow-throughput connection (for example, thousands of bytes per sec) may dictate checkpoints each time a significantly smaller number of bytes (for example, ten thousand bytes) have been transferred. Information relating to average data-throughput over various periods (i.e each second, each minute, each hour) is maintained for each connection in the server servicing that connection. This information can be accessed to determine the checkpoint interval dynamically.

Note that connection checkpoints as described herein can "bundle" connection information for related connections. For example File Transfer Protocol (FTP) connections involve separate control and data connections. Both data and control connections must be maintained together as a related pair to preserve an FTP connection. Accordingly the associated FTP checkpoint should write the connection information as a bundle in an atomic operation, so as to facilitate movement of both connections to the same backup server-as described further below. Note further that the connection bundle may contain some UDP connections in addition to TCP connections and it is obvious to one versed in the art that UDP connections can be restarted without requiring an "ACK" packet from the receiver, but otherwise using the methods described herein.

It is contemplated that the connection checkpoint API can be adapted to bundle connection information with respect to a protocol having a plurality of related connections, some of them involving TCP and some involving UDP, or another non-TCP transport protocol. In addition, the data packets on one or more of the data connections can be transmitted to one or more IP-multicast groups.

Figure 6:
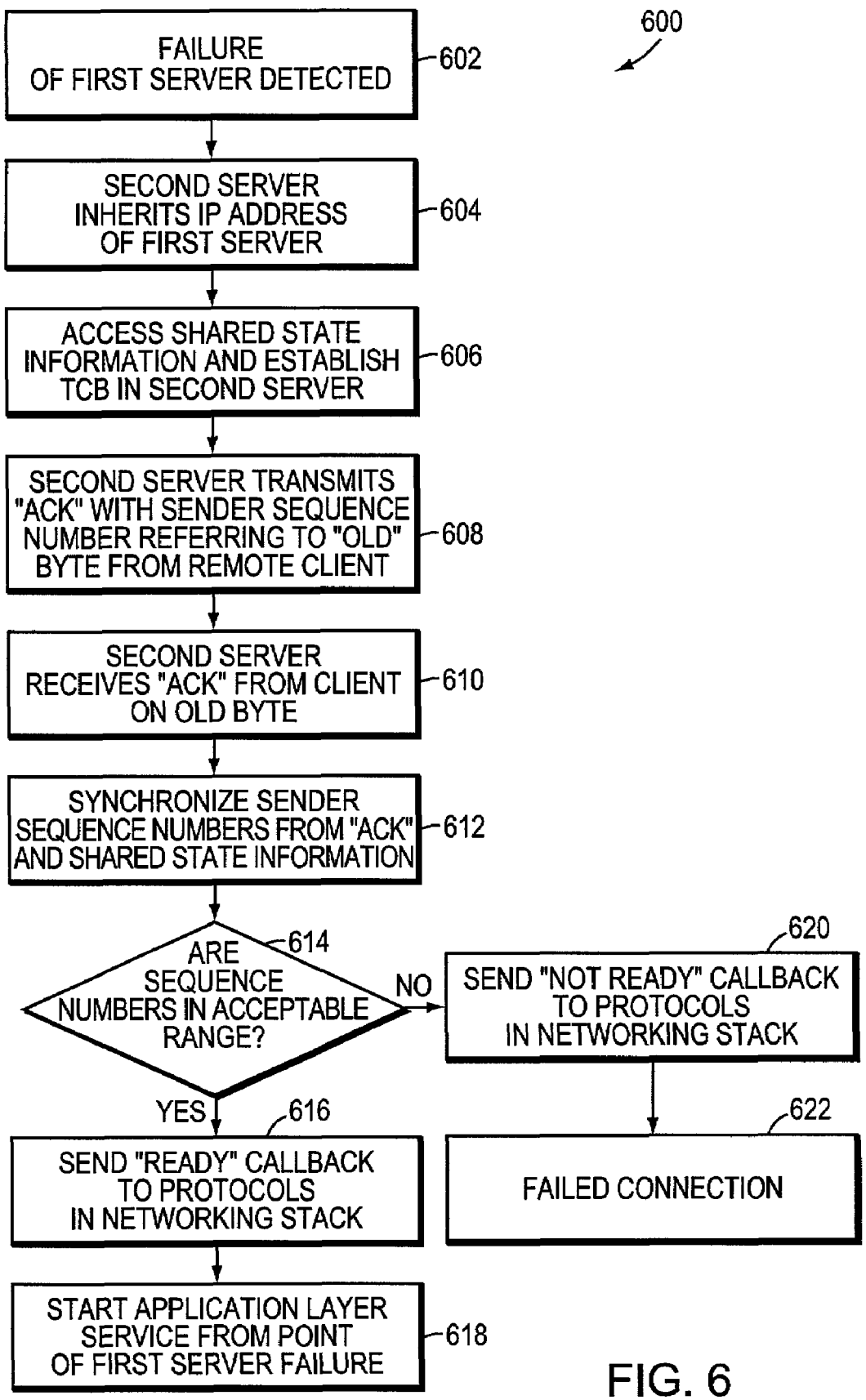
FIG. 6 is a flow diagram showing a procedure for carrying out a transparent, seamless failover of a TCP connection from a failed server to a backup server according to an illustrative embodiment.

FIG. 6 shows a procedure 600 for implementing the seamless takeover of a TCP connection from a first failed server to a second backup server in accordance with an illustrative embodiment of this invention. In accordance with step 602, the failure of the first server is detected by a second, backup server, by for example, the failure of a connection checkpoint with respect to the first server to occur. Such a failure would be evident from examination of the shared connection structure (340 in FIG. 3).

Which server in the cluster becomes the backup for a particular connection may be determined by an arbitrary approach (e.g. magnitude of the MAC address, or round robin) or based upon the directive of a load-balancing mechanism. The decision need not be made until a server fails; that is, there is no pre-assignment of server to backup server. This allows considerable flexibility in handling failure conditions within the local network infrastructure and increases the reliability of the network service.

In one method, the second server then inherits the failed, first server's IP address for the purposes of the subject connection (step 604). In other words, any packets from the client having a destination address naming the first server are redirected to the second server. This can be accomplished by a network switch (for example, the L4 switch) or another network-based switching mechanism, such as the WCCP protocol. Conversely, the direction of client packets to the new, second server can be accomplished by providing appropriate redirection information to an Address Resolution Protocol (ARP) table residing on one or more locations on the LAN (shared connection structure) to which the servers are connected. Whenever a packet is received it is converted to an Ethernet/LAN address, and is directed to the ARP table application to determine its final destination.

In another method, the L4 switch will automatically choose a backup server and direct the TCP packets to that server. Upon receiving a TCP packet for an unknown connection, the server will consult that shared state information and use the TCP port number (which must be unique within the cluster) to find the state information recorded by the first server. The L4 switch can make this determination based on failure of the first server or overloading of the first server. Once the second server locates the shared state information it can initiate the TCP connection restart procedure described herein.

At approximately the same time, according to step 606, the second server prepares to take over the TCP connection by consulting the shared state information for the data needed to establish an open Transmission Control Block (TCB) in the second server with respect to the connection. In general, the TCB includes send and receive port numbers, send and receive windows, send and receive sequence numbers, local and client IP addresses and other technical parameters needed to send and receive data reliably with a remote endpoint. In creating the TCB, an API call to reconstitute the connection is issued by the restart manager on the second server (260 in FIG. 2). This call enables each protocol in the second server's stack to use the shared state information to recreate its particular local connection structure. However, the protocol layer cannot use its recreated local structure until it receives a "ready" callback indicating that all the protocols below it in the network stack are ready to resume operation. This readiness, for TCP, involves the comparison of sequence numbers, as further described.

In accordance with step 608, the second server transmits a TCP ACK with a "sender sequence number" referring to an "old" byte of data that is known to have been transmitted already by the first server to the remote client, as indicated in the checkpoint data-this ACK must also have a "receiver sequence number" referring to byte of data known to have been transmitted from the client to the first server, as indicated in the checkpoint data. This message includes no TCP data, but it uses the transmit and receive sequence numbers indicated in the shared state information for the connection (this information has been used to create an "unready" TCB). This forces the respective TCP networking stack of the remote client, upon re-receipt of the message with the old transmit sequence number, to return an acknowledgement (ACK) in the normal course. The remote client may use a sequence number in its ACK that is higher than that in the checkpoint data. A higher number indicates that the first server sent more data than was recorded in the checkpoint data. When the ACK is received (step 610), the transmit sequence number provided in the ACK is compared to the transmit sequence number stored in the shared information. The two sequence numbers are synchronized (612) by using the greater number in the TCB. The successful synchronization will be followed by a "ready" callback from TCP to protocols or applications above it in the network stack.

If the client's ACK shows that the client had sent more information to the first server than was recorded in the checkpoint data (i.e., the client's "sender sequence number" is larger than the number is the checkpoint data), then the connection cannot be restarted because the server did not record information related to the client's request. In this case, the second server must reset the connection and wait for the client to start a new TCP connection to the application. In this case, TCP will use a "not ready" callback to the protocols or applications above it, and they will delete their recreated state information for this connection (steps 620 and 622).

In accordance with the decision step 614, if the connection client's returned sequence number is within an acceptable range with respect to the stored state information (which is checkpointed at a period that is relative to connection data-throughput or elapsed time), then "ready" callbacks are issued to the server's stack protocol layers (step 616). These callbacks contain information from the lower protocols, such as number of bytes sent and received (based upon the sequence numbers) to each protocol layer. When all protocol layers are directed "ready," the application layer service starts from the general point of failure by the first server (step 618) using the restarted TCP connection. This can occur seamlessly and transparently, with little or no noticeable delay on the client side.

The application's restart procedure can be performed in those cases where the application has access to the same information as the original server. For caching proxies, this is especially easy if the first server was delivering an object from the cache and the second server has access to the same object. The second server uses the difference between the transmit sequence number and the initial sequence number as an index into the byte stream of the object and begins transmitting from that point. Even if the object is not in the cache, the application can retrieve the object from the origin server, in a manner common to caching proxies, such as the above-referenced Volera Excelerator.

The application's restart procedure can be used for any named object, in particular a URL or a file.

As noted above, if the client's returned sequence number is too far out of range from the saved state information (decision step 610), then the connection cannot be reestablished and the callbacks return a "not ready" state to the protocol layers (step 620). At this time the subject TCP connection with the client fails, and must be completely reestablished (step 622).

It is noted that certain connections exhibit a greater "two-way" characteristic (e.g. significant data volume passing from the client to the server cluster), or otherwise may involve difficulties in setting sequence numbers between the two connection sides. In such cases, the failure to fully commit a server application level state to the shared information state before an ACK is returned from the server to the client may prevent a connection restart. It is contemplated that a further step can be provided in which no ACK is sent back by the server to the client until the subject server application permits it (e.g. only after fully committing its state to the shared state information). This results in highly reliable restart.

Note also that any additional burden taken on by the backup server(s) according to this embodiment, will temporarily increase the backup servers' load. It is contemplated that inherent load-balancing mechanisms within the server cluster will resettle the load in due course so that it is more evenly distributed to remaining servers.

While the above-described embodiment relates mainly to takeover of connections in the event of a cluster server failure, it is contemplated that the principles and procedures described herein can be applied to other scenarios in which it is desirable to transfer one or more TCP connections to a different server in a relatively seamless and transparent manner. For example, the takeover of connections can be applied specifically to load-balancing applications, where one or more connections are more-efficiently served by a less-burdened server in the cluster. As such movement of these connections to the other server is performed in a convenient and desirable way.

While the above-described embodiment relates mainly to World Wide Web (WWW or "web") services using HTTP, the principles and procedures described herein are applicable to any protocol which uses a client/server communication protocol wherein the client requests an object that can be retrieved by more than one server and which has a period of validity substantially greater than the expected time between detection of a server failure and reassignment of the connection to a new server.

It should be clear to those of skill in the art that the methods described herein are applicable to protocols less-complicated than TCP, in particular the UDP protocol. It is also obvious that the IP protocol can be either IP version 4 (IPv4) or IP version 6 (IPv6) without affecting any of methods.

The foregoing has been a detailed description of an illustrative embodiment of the invention. Various modifications and additions can be made without departing from the spirit and scope of the invention. For example, the number and configuration of servers and or clients can be highly varied. Likewise the architecture of the network or interconnection scheme between servers can be varied. While an unintended failure is the exemplary cause of connection takeover as described, it is expressly contemplated that other impetus for connection takeover may also be present, such as a scheduled server shutdown or maintenance operation. Also, while the exemplary server cluster herein is a proxy cache server cluster, it is contemplated that one or more of the servers may be other types of file servers. Finally, it is expressly contemplated that any of the operations or procedures herein can be implemented as a computer-readable medium, or functional data, including software program instructions executing on a computer or as hardware, or as a combination of hardware and software. Accordingly, this description is meant to be taken only by way of example, and not to otherwise limit the scope of the invention.

What is claimed is:

1. A method for takeover of a Transport Control Protocol (TCP) connection by a second server from a first server comprising:

generating shared state information with respect to the connection for access by the first server and the second server, wherein the shared state information includes an identification of an application layer protocol being used for communication of an application;

comparing a received data byte sequence number from an acknowledgement byte received by the second server with a sequence number related to the shared state information;

recreating the connection within the second server based upon the compared sequence numbers;

performing a connection checkpoint with an application program interface (API) so as to communicate with each of a plurality of protocols in the first server and so as to cause each of the plurality of protocols to append relevant state information to a data block passed to each of the plurality of protocols with respect to the connection, and to thereby provide the relevant state information to the shared state information; and relating, by the API, the compared sequence numbers in conjunction with the ready signal to a byte sequence number in an object referenced in the shared state information.

2. The method as set forth in claim 1 in which the relating includes resuming sending the data associated with an object over the restarted TCP connection.

* * * * *